United States Patent [19]

Morgan

[11] Patent Number: 5,107,072
[45] Date of Patent: Apr. 21, 1992

[54] FLUSH-MOUNTED INTERFLOOR POWER/COMMUNICATION CONNECTION APPARATUS WITH DEBRIS PROTECTION

[75] Inventor: Paul W. Morgan, Edison, N.J.

[73] Assignee: Thomas & Betts Corporation, Bridgewater, N.J.

[21] Appl. No.: 350,986

[22] Filed: May 12, 1989

[51] Int. Cl.[5] .................................................. H02G 3/22
[52] U.S. Cl. .......................................... 174/48; 174/67; 439/272; 439/521
[58] Field of Search ................... 174/48, 67, 66, 65 R, 174/65 G; 439/271, 272, 519, 521, 135, 136, 137, 278

[56] References Cited

U.S. PATENT DOCUMENTS

| | | | |
|---|---|---|---|
| 1,697,814 | 1/1929 | Forbes | 174/152 G |
| 2,816,951 | 12/1957 | Sperry | 439/271 X |
| 2,847,140 | 8/1958 | Voss | 220/3.3 |
| 3,318,476 | 6/1967 | Clark | 220/3.4 |
| 3,519,975 | 7/1970 | Prow, Jr. et al. | 439/271 |
| 3,531,010 | 9/1970 | Handley et al. | 220/40 |
| 3,603,048 | 9/1971 | Hadfield et al. | 52/221 |
| 3,646,244 | 2/1972 | Cole | 174/57 |
| 3,794,956 | 2/1974 | Dubreuil | 339/34 |
| 3,845,234 | 10/1974 | Brenner | 174/67 |
| 4,059,321 | 11/1977 | Rasmussen et al. | 339/34 |
| 4,149,028 | 4/1979 | Gressitt et al. | 174/65 R |
| 4,270,318 | 6/1981 | Carroll et al. | 52/1 |
| 4,297,524 | 10/1981 | Fork | 174/48 |
| 4,331,832 | 5/1982 | Curtis et al. | 174/57 |
| 4,443,654 | 4/1984 | Flachbarth et al. | 174/48 |
| 4,551,577 | 11/1985 | Byrne | 174/57 |
| 4,591,656 | 5/1986 | Mohr | 174/48 |
| 4,770,643 | 9/1988 | Castellani et al. | 439/135 |
| 4,783,577 | 11/1988 | Mohr | 174/48 |
| 4,827,080 | 5/1989 | Castellani et al. | 174/48 |

FOREIGN PATENT DOCUMENTS 1202435  1/1960  France ........................ 439/271
1184250  3/1970  United Kingdom ........... 439/135

OTHER PUBLICATIONS

Hubbell Catalog dated 1987 (H4312).
Thomas & Betts Catalog & Price Schedule, Jan. 12, 1987, pp. E234-236.

Primary Examiner—Leo P. Picard
Assistant Examiner—David A. Tone
Attorney, Agent, or Firm—Robert M. Rodrick; Salvatore J. Abbruzzese

[57] ABSTRACT

Apparatus for use in providing an electrical connector having a plug receptacle with protection from intrusion therein of foreign matter comprises a resilient membrane adapted for disposition in contiguous overlying relation to the connector. The membrane has a flat undersurface and extends therefrom to a preselected maximum thickness and therewith defines at least one recess extending from the undersurface for receipt of the connector plug receptacle. The membrane defines a pad distal from the undersurface by the extent of the recess. The pad includes a portion of thickness greatly reduced from the membrane maximum thickness and positioned for registry with a prong of the plug and readily penetrable thereby to sealingly seat the prong in the receptacle. The membrane may include a further pad penetrable for sealed passage of a communication cable therethrough. The membrane is comprised of a material adapted to self-close the membrane portion upon withdrawal of the prong and communication cable therefrom.

5 Claims, 8 Drawing Sheets

FLUSH-MOUNTED INTERFLOOR POWER/COMMUNICATION CONNECTION APPARATUS WITH DEBRIS PROTECTION

FIELD OF THE INVENTION

This invention relates generally to apparatus and methods for the transmission of electrical power and communication signals from one building floor to another and pertains more particularly to so-called "poke-thru" devices adapted for disposition in passages formed through concrete floors.

BACKGROUND OF THE INVENTION

There has been extensive prior art activity in the pursuit of averting the use of on-floor conduits for conveying electrical power and communication lines to floor locations which were not within the original architectural and electrical planning of a facility, such as a multi-floor concrete building. Such on-floor conduits are in the first place aesthetically unpleasant and secondly can give rise to personnel danger, such as by tripping over the same.

While the art has averted these problems in the introduction of flat undercarpet cable installations, the problem remains extant in the use of the conventional discrete wiring systems in place in general in existing buildings and for currently-planned facilities for which the undercarpet approach is not elected.

In the conventional discrete installations, the problem under discussion has been addressed by drilling a passage through the concrete floor and conducting power and/or communication signals from a lower floor to the floor in which a new power and/or communication signal outlet is desired. Electrical safety codes have placed two sanctions on such activity. Firstly, it is essential that the installed transition apparatus not function as a chimney or fire-advancing flue in the event of fire occurrence on the lower floor. Secondly, it is imperative that the transition apparatus not function as a conductive heat channel between floors.

The industry has largely met these requirements through the use of intumescent material in the transition apparatus, such material expanding under fire conditions against the concrete circumscribing the passage to effectively block the pre-existing flue which may have been present in the passage. Further, the art includes structures which have conductive heat blocking members, i.e., synthetic spacers, disposed axially between and separating conductive heat communication between heat conductive members of the apparatus.

Presently known transition apparatus can involve one of two diverse types of pedestals, i.e., the flush-mount pedestal and the low-profile pedestal, the latter protruding upwardly of the floor to an extent and the former being essentially continuous with the floor. The flush-mount pedestal has a disadvantage as against the low profile pedestal in that it is susceptible to entry of floor debris, such as dust, moisture and the like. The art has seen various measures taken protectively in this regard, such as sliding, swinging, threaded or other mechanical members to cover the pedestal face. Such measures have evident disadvantage in respect of increased cost of manufacture of the installation and labor intensity in use.

SUMMARY OF THE INVENTION

The present invention has as its primary object the provision of improved transition apparatus for interfloor conveyance of electrical power and communication signals.

A particular object of the invention is to provide interfloor electrical connection apparatus adapted for use with flush-mounted pedestals and providing debris-resistant structure therein at lessened cost and of lessened labor intensity in use.

In the attainment of these and other objects, the invention looks particularly to an electrical connection housing assembly for insertion in an interfloor passage for floor-to-floor electrical transmission of both power and communication, the housing assembly being adapted for receipt of a flush-mounted pedestal, and the invention provides such type of assembly with debris-resistant structure not requiring mechanical input thereto prior to electrical plug insertion therein.

The housing assembly is addressed as background herein and includes a first housing comprised of first matter and a second housing comprised of second matter of lesser heat conductivity than the first matter. The second housing has a first portion assembled with the first housing and a second portion extending from the first housing. A power/communication divider unit is provided for separating respective power and communication cables to be inserted in the assembly from one another and the second housing defines keying for receipt of a divider suited to a flush-mount pedestal.

The pedestal is applied to the housing assembly through the use of a cover plate secured to the pedestal and a locating bracket applied to the housing assembly. Per the invention herein, a plate is secured to the cover plate and is situated on a protective cover, which is a resilient membrane defining pads in registry with power outlets of the pedestal and having at least one peripheral pad for passage of the communication cable therethrough.

The protective cover is composed such that it is impermeable to dust and the like and functions as a barrier to same entering the assembly, but is penetrable to permit passage of the communication cable through such peripheral pad and to likewise permit passage of electrical plug prongs therethrough for connection in the pedestal outlets. Further, upon removal of the cable and prongs, the protective cover self-closes.

The foregoing and other objects and features of the invention will be further understood from the following detailed description of preferred embodiments thereof and from the drawings, wherein like reference numerals identify like parts and components throughout.

DETAILED DESCRIPTION OF PREFERRED EMBODIMENTS AND PRACTICES

Figure 1:
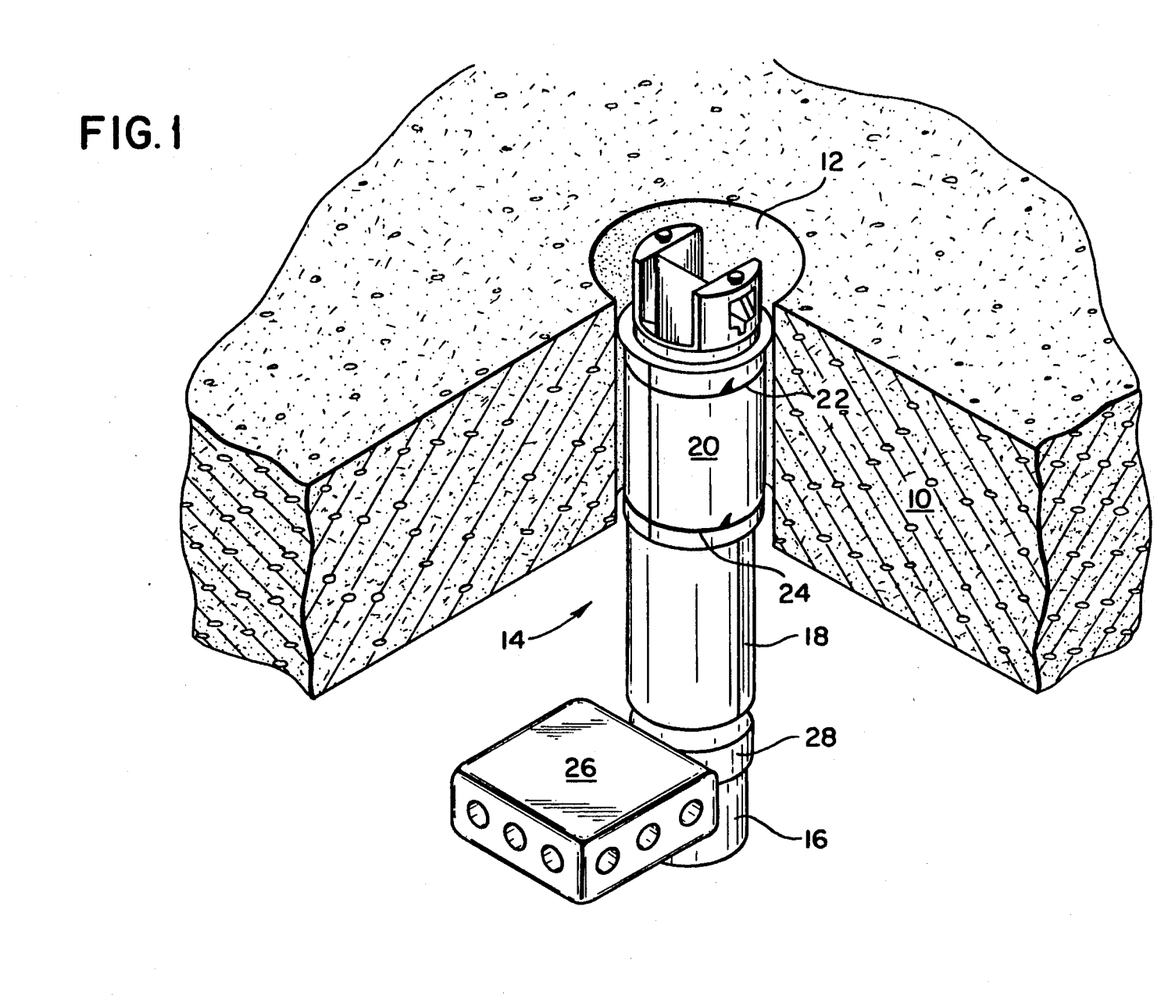
FIG. 1 is a perspective view of a partial connector housing assembly in accordance with the invention disposed in a concrete floor passage, the concrete being broken away for purposes of illustration.

Referring to FIG. 1, concrete floor 10 has passage 12 formed therethrough and connector housing assembly 14 formed in part in accordance with the invention is disposed in passage 12. Assembly 12 includes lower housing 16, upper housing 18, intumescent material 20 wrapped about assembly 14 and secured thereto by wire straps 22 and 24. An electrical connection box 26 is secured to lower housing 16 by strap 28, whereby electrical power and communication signals on an underfloor may be advanced to an upper floor, the cabling therefor not being shown in FIG. 1.

Figure 2:
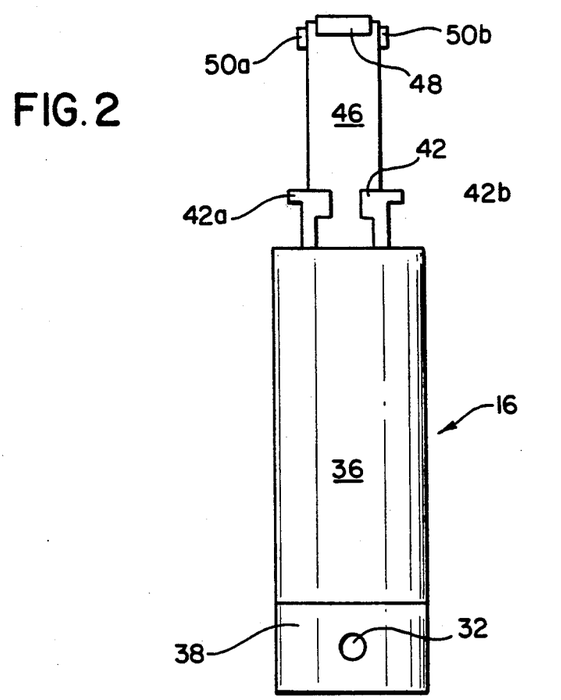
FIG. 2 is a front elevation of the lower housing of the FIG. 1 assembly.
Figure 3:
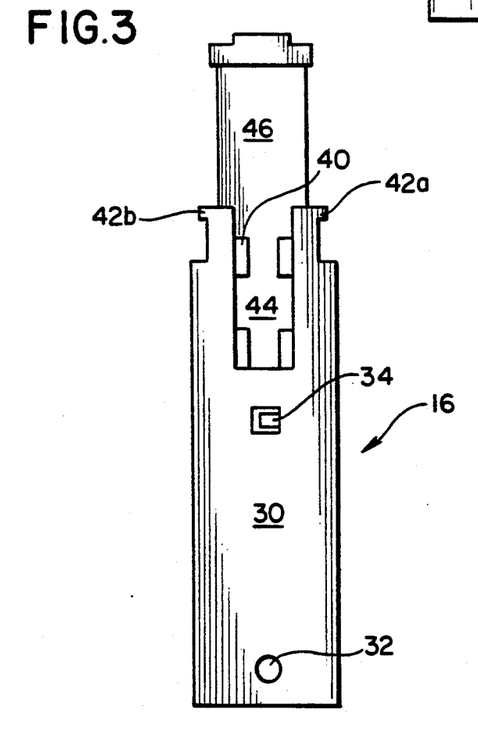
FIG. 3 is a rear elevation of the housing of FIG. 2.
Figure 4:
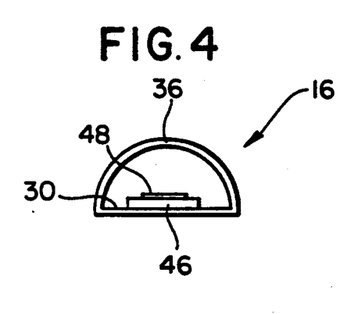
FIG. 4 is a bottom plan view of the housing of FIG. 2.
Figure 8:
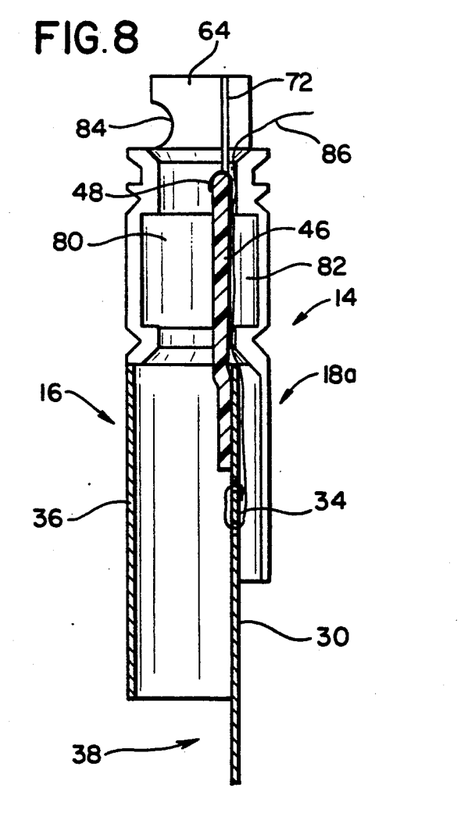
FIG. 8 is a sectional view of the assembled lower and upper housings as would be seen from the upper housing joinder line 52 of FIGS. 5 and 6.

Turning to FIGS. 2–4, lower housing 16 includes a flat wall 30 which is comprised of electrically conductive matter, such as a metal, and defines a ground connection opening 32 and a fitting 34 for connection of a grounding wire, e.g., wire 86 in FIG. 8.

Housing 16 has arcuate front wall 36 continuous with flat wall 30 and defining therewith a channel for the receipt of a communication cable. A lowermost opening 38 is formed in front wall 36 for insertion of the communication cable.

Wall 30 has a top opening 44 bounded by tabs 40 on its rearward side and by tabs 42 on its forward side for the receipt and retention of separator or first divider 46 which extends upwardly from wall 30 axially therewith to a free end at which divider 46 has member 48 affixed thereto. Keys 42a and 42b are formed on tabs 42 and keys 50a and 50b are formed on member 48 for purposes discussed below.

Figure 5:
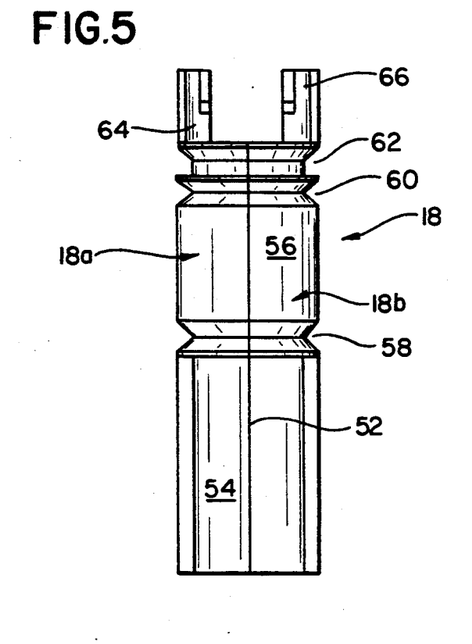
FIG. 5 is a front elevation of the upper housing of the FIG. 1 assembly.
Figure 6:
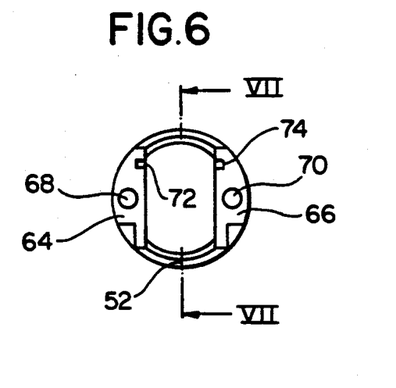
FIG. 6 is a top plan view of the housing of FIG. 5.
Figure 7:
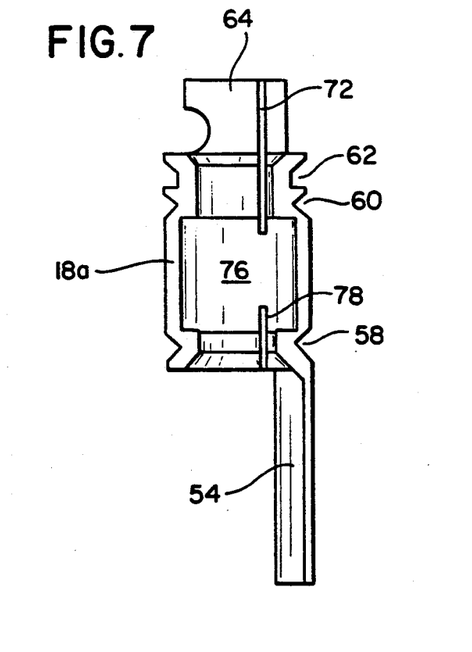
FIG. 7 is a sectional view as would be seen from plane VII—VII of FIG. 6.

FIGS. 5–7 depict the configuration of upper housing 18 of FIG. 1. In preferred form, housing 18 is comprised of parts 18a and 18b, which are matable along mating line 52, each such part being inclusive of a tail section 54 of open partial semi-cylindrical configuration and a further section 56 of full semi-cylindrical configuration. Recesses are formed in section 56 as at 58 and 60 for cooperation with straps 24 and 22 respectively for securement of intumescent material 20 (FIG. 1).

Figure 9:
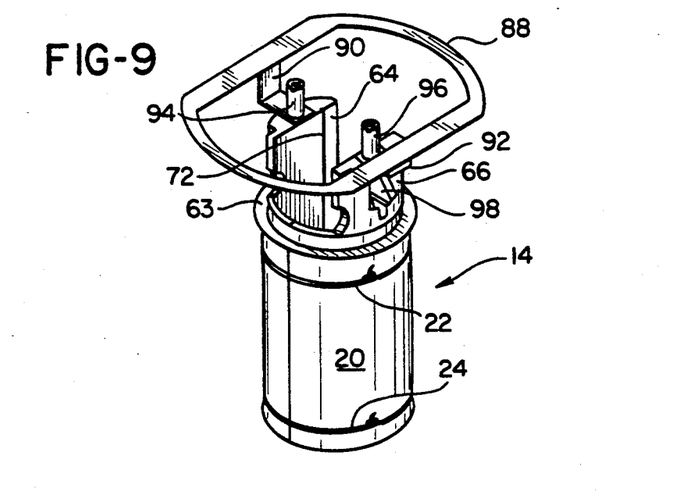
FIG. 9 is a partial perspective view of the FIG. 1 assembly with a locating bracket applied thereto.

Recess 62 supports the receipt of sealing ring 63 (FIG. 9). Upwardly of section 56, housing 18 has projections 64 and 66 which are in spaced and facing relation to one another. Threaded openings 68 and 70 are formed respectively in projections 64 and 66, as are slots 72 and 74. As is seen particularly in FIG. 7, compartment 76 is recessed in the sidewall of the housing sections for the receipt of a tumescent material cylinder, also not shown. FIG. 7 also depicts lower interior slot 78 formed in member 18a for purposes below discussed.

FIG. 8 shows a sectioned assembly of lower housing 16 and upper housing 18a, wherein divider 46 is shown in positionally controlled position, defining channels or compartments 80 on one side thereof and 82 on the other side thereof. In this connection, key 42b and key 50b are resident respectively in slots 78 and 72, key 42a is resident in a slot counterpart to slot 78 in housing 18b and key 50a is resident in slot 74 (FIG. 6). Arcuate section 84 is formed in projection 64 to pass the communication cable upon insertion thereof in compartment 80. Grounding wire 86, affixed, typically by soldering, to member 34 extends through compartment 82 exteriorly of assembly 14.

Turning to FIG. 9, in preparation of assembly 14 for use with a flush-mount pedestal, locating bracket 88 is applied to projections 64 and 66 by placing its dependent arms 90 and 92 on the projections and securing the same in place with fittings 94 and 96. A side channel 98 is formed in projection 66, and also in projection 64 (not shown) for constraining a securement nut against rotation for cooperation with fittings 96 and 94.

Divider 100 (FIG. 10) is formed of sheet metal and includes sidewalls 102 and 104 defining notches 102a and 104a and floor 106a from which extends a tapered portion 106b, the latter including keys 106c and 106d.

Figure 10:
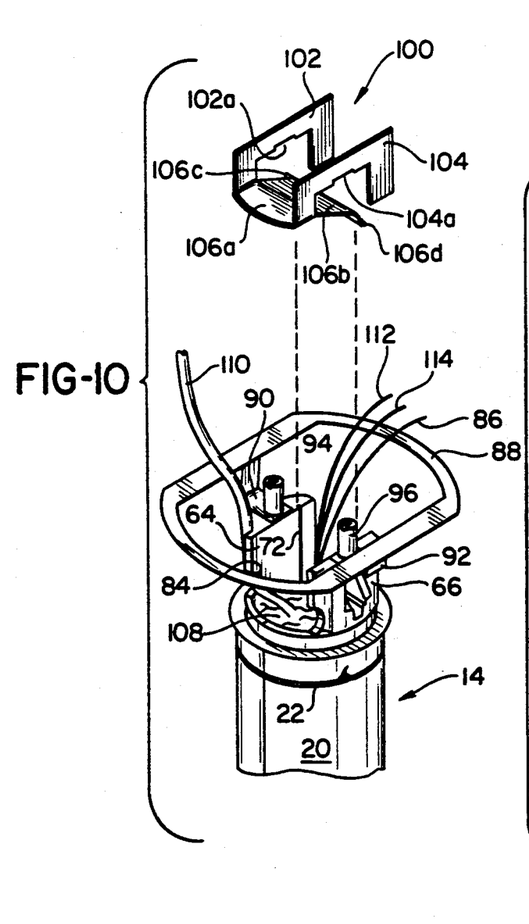
FIG. 10 is an exploded perspective view of the FIG. 9 assembly and a removable divider for insertion therein.

Prior to insertion of divider 100 in assembly 14, putty 108 is used to fill the inside of the assembly, being firmly placed about communication cable 110, grounding wire 86, and power conductors 112 and 114. Communication cable 110 is dressed through opening 84 as indicated. Divider 100 is now inserted into the assembly, keys 106c and 106d entering slots 72 and 74 respectively, insertion continuing until ends of arms 90 and 92 register with notches 102a and 104a.

Figure 11:
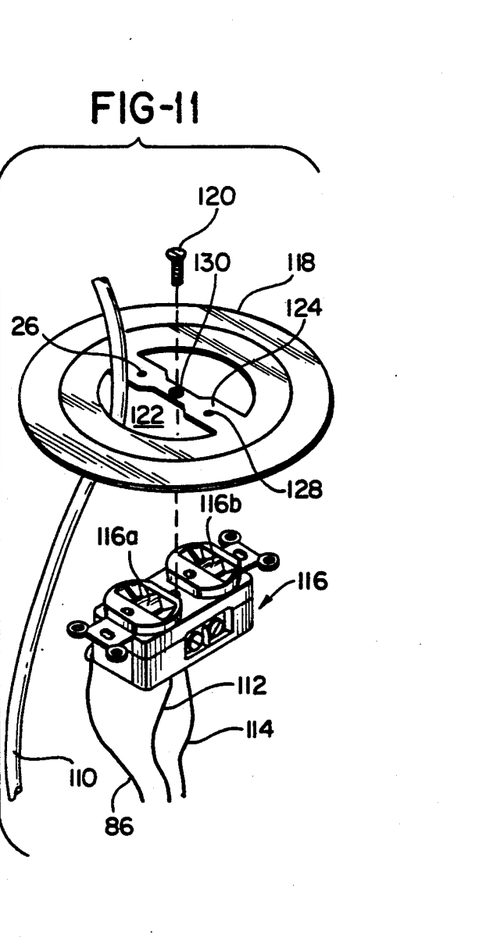
FIG. 11 is an exploded perspective view of a flush-mount pedestal and a cover plate therefor.

Turning to FIG. 11, receptacle 116 has dual outlets 116a and 116b of customary three prong type. Cover plate 118 is secured to receptacle 116 by screw 120 and includes opening 122 for access to the outlets. Crossarm 124 centrally spans opening 122 and includes side openings 126 and 128 and central opening 130 for passage of screw 120.

Figure 12:
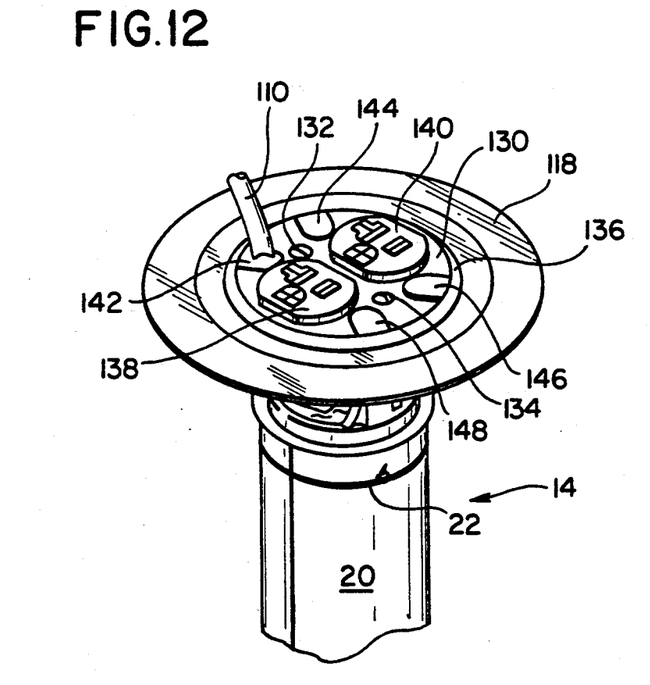
FIG. 12 is a perspective view showing the pedestal and cover plate of FIG. 11 applied to the assembly shown in FIG. 10.

The completion of assembly 14 is depicted in FIG. 12, where plate 131 is shown secured in place by screws 132 and 134, which reside in openings 126 and 128 of of cover plate 118 of FIG. 11. Plate 131 is situated on protective cover 136, which is a resilient member defining pads 138 and 140 in registry with outlets 116a and 116b and peripheral pads 142, 144, 146 and 148. Cover 136 is composed such that it is impermeable to dust and the like and functions as a barrier to the same entering the assembly, but is penetrable to permit passage of communication cable 110 through one of its peripheral pads, as shown at pad 142. Further, the prongs of electrical plugs are insertable through pads 138 and 140 and, upon removal of the plugs, cover 136 self-closes.

The protective structure of the invention will be understood in more detail by reference to the generic embodiment and usage thereof shown in FIGS. 13 through 18, to which reference is now made.

Figure 13:
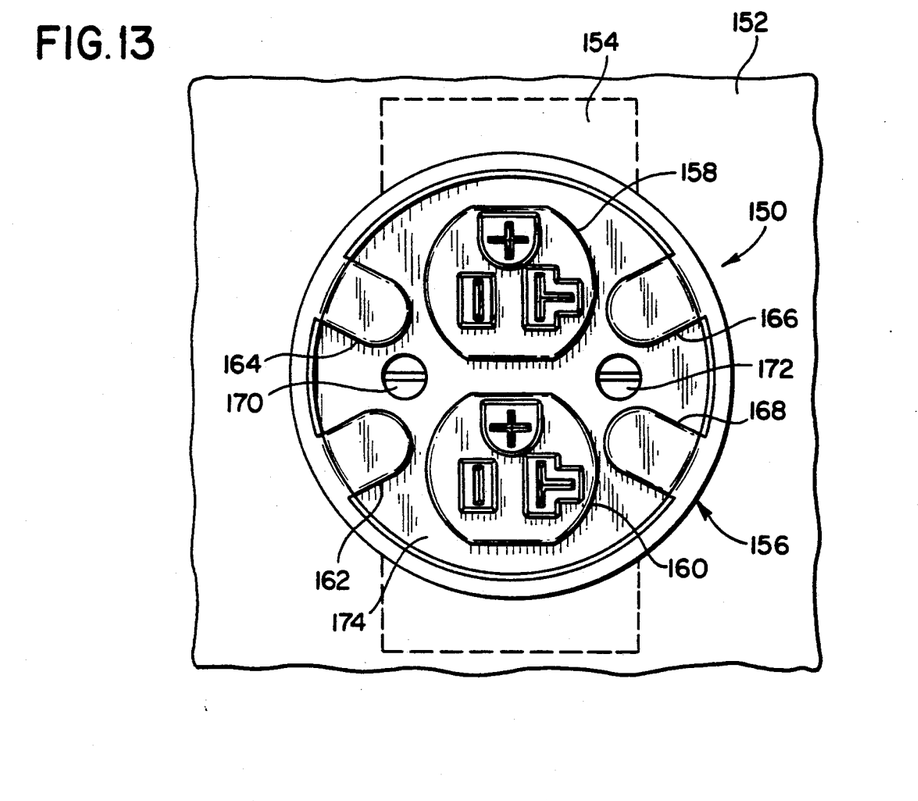
FIG. 13 is a top plan view of a generic embodiment and usage of a protective cover assembly in accordance with the invention.

Protective cover assembly 150 is shown in FIG. 13 applied to plate 152, which is disposed on a floor having an opening in which flush-mount pedestal 154 is resident. Membrane 156, a resilient member which may be comprised of neoprene rubber or polyurethane, is disposed on plate 152 and includes outlet receptacle pads 158 and 160 and communication cable pads 162, 164, 166 and 168. Screws 170 and 172 secure cover plate 174 atop membrane 156 to pedestal 154.

Figure 14:
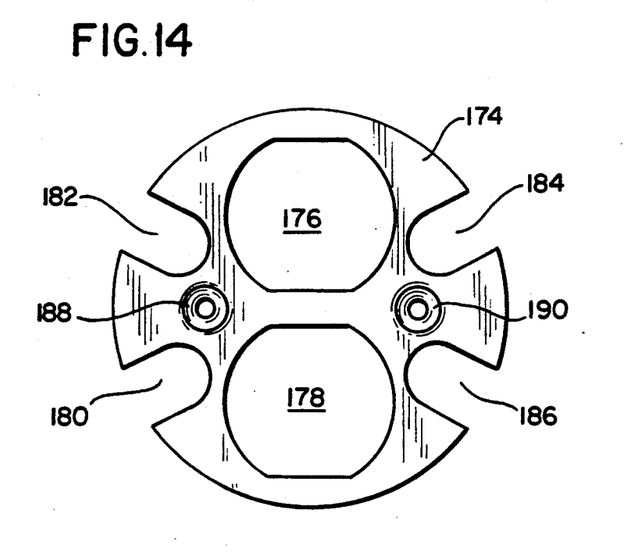
FIG. 14 is a top plan view of the top plate of the FIG. 13 assembly.
Figure 15:
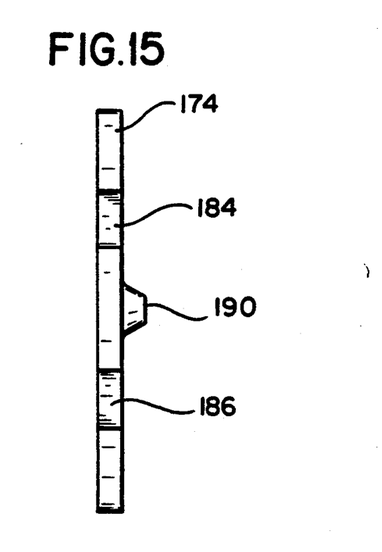
FIG. 15 is a side elevation of the top plate of FIG. 14.

Cover plate 174, which is rigid and comprised of metal, is seen in FIGS. 14 and 15 to have central openings 176 and 178 for passage of membrane pads 158 and 160 and perimetric slots 180, 182, 184 and and 186, extending radially inwardly of plate 174 for passage of pads 162–168 therethrough. Screw passage openings 188 and 190 are counterbored.

Figure 16:
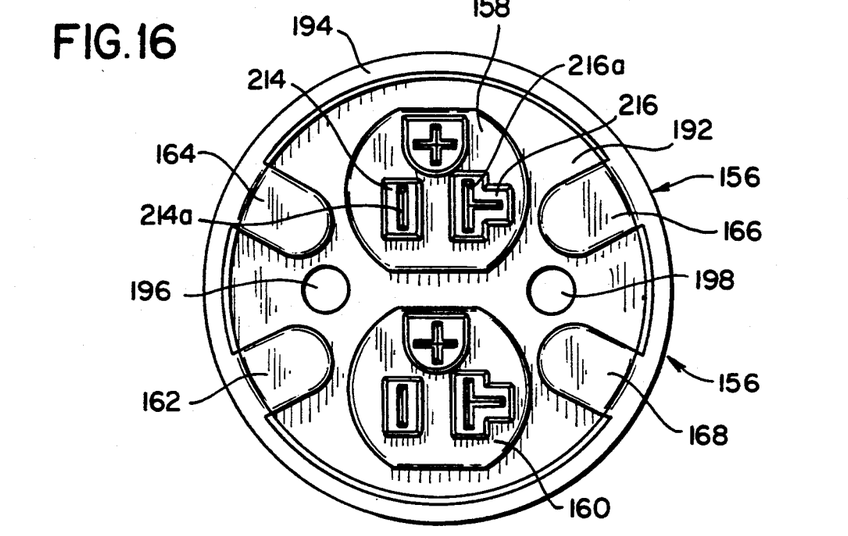
FIG. 16 is a top plan view of the protective cover of the FIG. 13 assembly.
Figure 17:
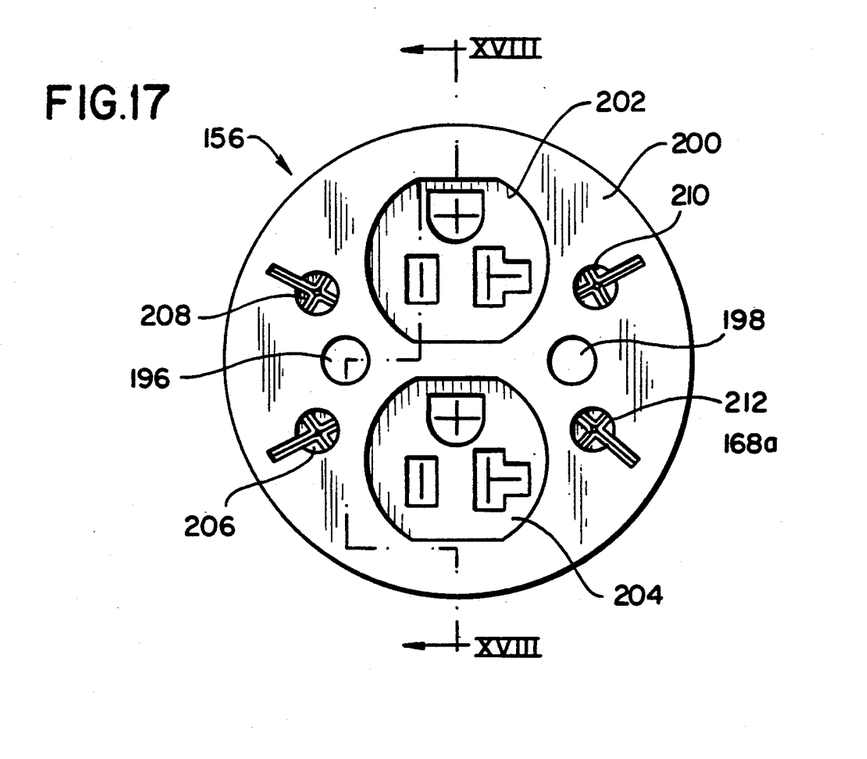
FIG. 17 is a bottom plan view of the protective cover of the FIG. 13 assembly.

In addition to its structure above discussed, membrane 156 is seen in FIG. 16 to have a flat surface 192 extending intermediate its various pads for juxtaposition underneath cover plate 174, a peripheral tapered portion 194 and screw passage openings 196 and 198. FIG. 17 further indicates membrane 156 to have a flat undersurface 200, outlet receptacle receiving recesses 202 and 204 and communication cable receiving recesses 206, 208, 210 and 212, all such recesses extending upwardly from undersurface 200 to the various pads of membrane 156.

As is illustrated, outlet receptacle pads 158 and 160 are formed with indentations at least in the upper surface of membrane 156 in registration with plug prong receiving areas thereof. Thus, for example, polarized prong receiving areas 214 and 216 of pad 158 have indentations 214a and 216a respectively therein. Likewise, the communication cable pads of membrane 156 are formed with indentations in the lower surfaces thereof. Thus, for example, pad 168 has a cross-indentation 168a formed at its undersurface as is seen at recess 212 in FIG. 17.

Such indentations provide weakened areas of relatively small thickness, facilitating penetrability of membrane 156 and reclosure of the areas upon withdrawal of the penetrating elements, which provides the membrane with a self-closure capability.

Figure 18:
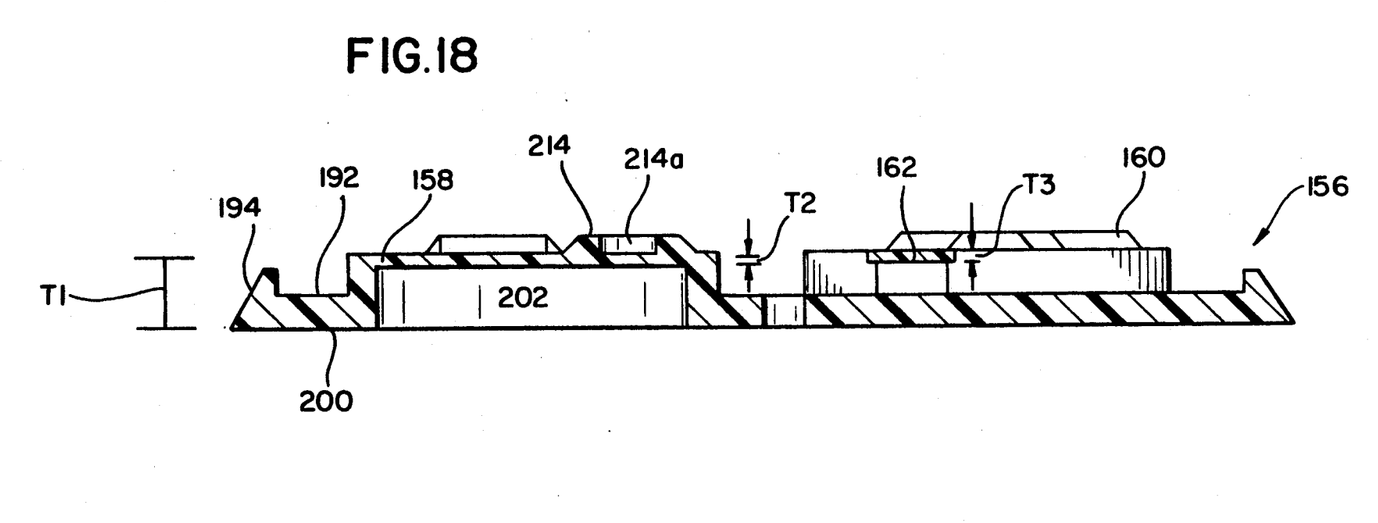
FIG. 18 is a sectional view of the protective cover of the FIG. 13 assembly as would be seen from plane XVIII—XVIII of FIG. 17 on an enlarged scale.

The operative structure of membrane 156 is particularly clear from the enlarged sectional view of FIG. 18. The membrane has a preselected maximum thickness in its dimension T1, surrounding recess 202 and supporting pad 158. Polarized prong receiving area 214 of pad 158 has a greatly reduced thickness dimension T2 at indentation 214a. Likewise, the communication pads have a greatly reduced thickness, as is indicated by dimension T3, shown for sectioned communication cable pad 162.

Various changes may be introduced in the foregoing apparatus and modifications may be made in the described practices without departing from the invention. For example, the protective apparatus of the invention will be seen to have application to electrical plugs of configuration other than those shown above. Accordingly, it is to be appreciated that the particularly depicted and described embodiments and practices are intended in an illustrative and not in a limiting sense. The true spirit and scope of the invention are set forth in the following claims.

What is claimed is:

1. An electrical connection housing assembly for insertion in an interfloor passage for floor-to-floor electrical transmission of both power and communication, said housing assembly comprising:
   (a) a first housing comprised of first matter;
   (b) a second housing comprised of second matter of lesser heat conductivity than said first matter, said second housing having a first portion assembled with said first housing and a second portion extending from said first housing;
   (c) divider means for separating respective power and communication cables to be inserted in said assembly from one another;
   (d) electrical pedestal means mounted by said assembly flush with said floor and including outlet means connected to said power cables and adapted for receipt of an electrical plug; and
   (e) means for use in providing said pedestal means with protection from intrusion therein of foreign matter, comprising a resilient membrane adapted for disposition in contiguous overlying relation to said outlet means, said membrane having portions penetrable by both said plug and said communication cable for passage of both thereof through said membrane.

2. The invention claimed in claim 1 further including plate means for disposition in overlying relation to said membrane, said plate means defining an undersurface in contiguity with said membrane and defining openings therethrough for passage of said membrane portions therethrough.

3. The invention claimed in claim 1 wherein said membrane is comprised of a material adapted to self-close said portions upon withdrawal of said plug and said communication cable therefrom.

4. The invention claimed in claim 1 wherein said membrane includes at least a pair of said portions mutually spaced to receive power prongs of said electrical plug.

5. The invention claimed in claim 1 wherein said membrane includes at least three such portions spaced relative to one another to receive power prongs and a ground prong of said electrical plug.

* * * * *